(12) United States Patent
Eschenbach et al.

(10) Patent No.: US 10,497,950 B2
(45) Date of Patent: Dec. 3, 2019

(54) FUEL CELL SYSTEM HAVING A HUMIDIFIED OXIDANT FLOW

(71) Applicant: Bayerische Motoren Werke Aktiengesellschaft, Munich (DE)

(72) Inventors: Max Eschenbach, Munich (DE); Simon Grilc, Munich (DE); Marc Becker, Vaterstetten (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 164 days.

(21) Appl. No.: 15/680,372

(22) Filed: Aug. 18, 2017

(65) Prior Publication Data
US 2017/0346111 A1    Nov. 30, 2017

Related U.S. Application Data

(63) Continuation of application No. PCT/EP2016/052456, filed on Feb. 5, 2016.

(30) Foreign Application Priority Data

Mar. 13, 2015   (DE) .................. 10 2015 204 620

(51) Int. Cl.
*H01M 8/04119* (2016.01)
*H01M 8/04082* (2016.01)
(Continued)

(52) U.S. Cl.
CPC ... *H01M 8/04141* (2013.01); *H01M 8/04126* (2013.01); *H01M 8/04156* (2013.01);
(Continued)

(58) Field of Classification Search
CPC .......... H01M 8/0414; H01M 8/04126; H01M 8/04156; H01M 8/04201; H01M 8/04291; H01M 8/04835
See application file for complete search history.

(56) References Cited

U.S. PATENT DOCUMENTS

| 6,338,472 B1 | 1/2002 | Shimazu et al. |
| 2008/0090124 A1 | 4/2008 | Barleben et al. |

(Continued)

FOREIGN PATENT DOCUMENTS

| CN | 102222794 A | 10/2011 |
| CN | 102763258 A | 10/2012 |

(Continued)

OTHER PUBLICATIONS

KR 20110044659—machine translation (Year: 2011).*

(Continued)

*Primary Examiner* — Gregg Cantelmo
(74) *Attorney, Agent, or Firm* — Crowell & Moring LLP

(57) ABSTRACT

A fuel cell system includes at least one fuel cell, an oxidant conveyor, a humidifier and at least one water sink. The oxidant conveyor conveys an oxidant through a supply line to the fuel cell. The humidifier introduces water into the oxidant flow. The humidifier is arranged in and/or downstream of the oxidant conveyor and upstream of the fuel cell. The water sink is arranged between the fuel cell and the oxidant conveyor. The water sink is formed and arranged in the supply line in such a way that it prevents liquid water located in the supply line from flowing to the oxidant conveyor.

15 Claims, 3 Drawing Sheets

(51) Int. Cl.
  *H01M 8/04291* (2016.01)
  *H01M 8/04828* (2016.01)
  *H01M 8/1018* (2016.01)

(52) U.S. Cl.
  CPC ... *H01M 8/04201* (2013.01); *H01M 8/04291* (2013.01); *H01M 8/04835* (2013.01); *H01M 2008/1095* (2013.01); *H01M 2250/20* (2013.01); *Y02T 90/32* (2013.01)

(56) References Cited

U.S. PATENT DOCUMENTS

| | | | |
|---|---|---|---|
| 2013/0004866 A1 | 1/2013 | Gerhardt et al. | |
| 2014/0193726 A1* | 7/2014 | Noh | H01M 8/04141 429/414 |
| 2014/0377675 A1 | 12/2014 | Peterson et al. | |

FOREIGN PATENT DOCUMENTS

| | | | |
|---|---|---|---|
| DE | 10 2004 053 237 A1 | | 5/2006 |
| DE | 10 2008 053 151 A1 | | 4/2010 |
| DE | 10 2010 007 977 A1 | | 8/2011 |
| KR | 20110044659 A | * | 4/2011 |
| WO | WO 2004/027907 A2 | | 4/2004 |
| WO | WO 2006/056276 A1 | | 6/2006 |
| WO | WO 2011/098279 A1 | | 8/2011 |

OTHER PUBLICATIONS

German-language Search Report issued in counterpart German Application No. 10 2015 204 620.6 dated Oct. 13, 2015 with partial English translation (11 pages).
International Search Report (PCT/ISA/210) issued in PCT Application No. PCT/EP2016/052456 dated Apr. 5, 2016 with English translation (7 pages).
German-language Written Opinion (PCT/ISA/237) issued in PCT Application No. PCT/EP2016/052456 dated Apr. 5, 2016 (6 pages).
Chinese Office Action issued in Chinese counterpart application No. 201680004852.5 dated Aug. 26, 2019, with English translation (Sixteen (16) pages).

* cited by examiner

FUEL CELL SYSTEM HAVING A HUMIDIFIED OXIDANT FLOW

CROSS REFERENCE TO RELATED APPLICATIONS

This application is a continuation of PCT International Application No. PCT/EP2016/052456, filed Feb. 5, 2016, which claims priority under 35 U.S.C. § 119 from German Patent Application No. 10 2015 204 620.6, filed Mar. 13, 2015, the entire disclosures of which are herein expressly incorporated by reference.

BACKGROUND AND SUMMARY OF THE INVENTION

The technology disclosed here relates to a fuel cell system having a humidified oxidant flow.

The performance and efficiency of a fuel cell can be increased by humidifying the cathode air. This is particularly the case at increased operating temperatures of the fuel cell, e.g. at a coolant output temperature from the fuel cell of greater than 75° C. Additional humidification of the oxidant flow is particularly necessary at increased operating temperatures and/or with high fuel cell capacities.

DE 102008053151 A1 discloses a device in which a liquid medium may be introduced upstream of a charge air cooler and downstream of a compressor by means of a metering device. The humidification level here is set by a charge air cooler acting as a contact humidifier and by an additional membrane humidifier. It has been established that failure of the compressor occurs more frequently in fuel cell systems having humidifying devices. It is furthermore found in the previously known systems that, when the water is introduced into the supply line, the water does not completely evaporate. Furthermore, liquid water can form again from evaporated water on the walls of the supply line. In winter, this liquid water can freeze in the supply line. Water defrosting in the supply line of the fuel cell during a cold start can markedly impair the cold start. The frozen liquid water can furthermore damage the supply line.

It is the object of the present invention to reduce or eliminate the disadvantages of the previously known solutions. Further objects emerge from the advantageous effects of the technology disclosed here. The object(s) is/are achieved by the fuel cell system in accordance with embodiments of the invention.

The technology disclosed here relates to a fuel cell system having at least one fuel cell. The fuel cell system is intended, for example, for mobile applications such as motor vehicles. In its simplest form, a fuel cell is an electrochemical energy converter, which converts fuel and oxidant into reaction products and thereby produces electricity and heat. The fuel cell comprises an anode and a cathode which are separated by an ion-selective separator. The anode has a supply for supplying fuel to the anode. Preferred fuels are: hydrogen, low-molecular alcohol, biofuels or liquefied natural gas. The cathode has, for example, a supply for oxidant. Preferred oxidants are, for example, air, oxygen and peroxide. The ion-selective separator can be formed, for example, as a proton exchange membrane (PEM). A cation-selective polymer electrolyte membrane is preferably used. Materials for such a membrane are, for example: Nafion®, Flemion® and Aciplex®. A fuel cell system comprises at least one fuel cell and peripheral system components (BOP components) which can come into use during operation of the at least one fuel cell. A plurality of fuel cells are generally combined to form a fuel cell stack.

The fuel cell system comprises an oxidant conveyor which conveys an oxidant to the cathode of the fuel cell. Such an oxidant conveyor can be formed, for example, as a supercharger or turbo compressor or as a compressor. The oxidant conveyor can convey the oxidant, preferably oxygen or air, through a cathode supply line, a supply line or an intake tract (the term "supply line" will be used below for simplicity) into the cathode. The oxidant conveyor is, for example, capable of compressing the oxidant to a pressure of greater than 1 bar. With this, the oxidant can be heated, for example, up to 160° C. and above. The oxidant conveyor is arranged upstream of the cathode in the supply line.

The fuel cell system furthermore comprises at least one humidifier, which introduces, preferably injects or sprays, a liquid, in this case water, into the oxidant flow. The terms spraying or atomizing of the liquid refer here to the dispersal of the liquid into the finest droplets (aerosol or mist) in the oxidant. By atomizing the water, a good mixing with the air flow can be ensured and the injected water can evaporate or vaporize more quickly owing to the large reactive liquid surface. To this end, the fuel cell system can be equipped with pressure nozzles which inject the water into the oxidant flow. For the finest droplets, for example, an injector or nozzle is provided with a water pressure of up to 20 bar. The nozzles can also be designed in such a way that the oxidant flow takes in the water itself in accordance with the Venturi effect or according to the principle of the ejector pump. The humidifier is arranged in and/or downstream of the oxidant conveyor and upstream of the fuel cell, preferably upstream of a heat exchanger or heat interchanger (hereinafter: heat exchanger) in the supply line. The water which is injected constitutes a store for a cooling capacity. To this end, a water reservoir can store the accumulating product water, for example, which is separated, for example, from the exhaust gas of the fuel cell.

The humidifier is preferably arranged at a spacing from the heat exchanger. The humidifier is preferably arranged in (e.g. in the volute) and/or adjacent to the oxidant conveyor. The humidifier is particularly preferably arranged at a spacing of at least about 0.3L, furthermore preferably at least about 0.5L and particularly preferably at least about 0.75L from the heat exchanger or from the fuel cell, wherein L is the distance of the oxidant flow between the oxidant conveyor and the heat exchanger. The humidifier is preferably formed integrally with the oxidant conveyor. It is thereby advantageously achieved that at least a high proportion of the water sprayed in is evaporated before it enters the heat exchanger.

The fuel cell system disclosed here comprises at least one water sink. The water sink is arranged in particular between the at least one fuel cell and the oxidant conveyor.

It has been established that unfavorable geometric integration, dynamic operation (constant transverse/longitudinal acceleration) or tilting can cause the liquid water to run back into the compressor and damage it. The water sink can be formed and arranged in the supply line in such a way that it prevents liquid water located in the supply line from flowing back or to or into the oxidant conveyor.

Such a water sink can also be referred to as a return stop. In particular, the water sink can be a depression or protrusion in relation to other regions of the supply line. The depression or protrusion can be arranged lower or deeper than the surrounding regions of the supply line. Any liquid water which is located in the supply line (e.g. on the walls of the supply line) collects in the water sink. The water sink is therefore formed and arranged in such a way that the water sink can collect or store liquid water located in the supply line. The water sink is preferably arranged at the deepest point of the supply line section for which the water sink is intended to collect liquid water. The water can thus be prevented from returning to the oxidant conveyor. It can thus be ensured that the liquid water is unable to cause mechanical and/or electrical damage in the oxidant conveyor. The water sink is furthermore preferably formed in the supply line in such a way that the flow cross-section for the oxidant flow O is not altered by the water sink. In other words, the water sink is formed by a depression or protrusion in the supply line wall.

The term "adjacent to the oxidant conveyor" comprises embodiments in which the humidifier or the water sink is arranged immediately adjacent to the oxidant conveyor or at a slight spacing from the oxidant conveyor. The at least one water sink is preferably formed adjacent to the oxidant conveyor. The humidifier and/or the water sink is preferably arranged to be a maximum of about 0.2L, furthermore preferably a maximum of about 0.1L and particularly preferably a maximum of about 0.05L away from the oxidant conveyor.

The at least one water sink is preferably fluid-connected to the humidifier and/or to at least one further water injection device. It is thus ensured that the collected liquid water can be discharged again by simple means. The liquid water is thus efficiently used again for humidifying the fuel cell. For example, the water sink can be connected to the at least one humidifier via corresponding lines. However, a design in which the water sink is fluid-connected only to a water injection device arranged immediately adjacent to the water sink in the supply line is preferred. The spacing between the water sink and the water injection device is preferably a maximum of about 0.2L, furthermore preferably a maximum of about 0.1L and particularly preferably a maximum of about 0.05L. It is thus advantageously possible to dispense with any space-consuming and costly lines.

The at least one water injection device is preferably formed as an ejector pump. Ejector pumps as such are known. They substantially constitute a rotated pitot tube which can itself take in water in accordance with the Venturi effect, for example. Such ejector pumps are also referred to as ejectors or as jet pumps. The oxidant flowing past the ejector pump can serve as a propellant here and has the expedient effect that the ejector pump takes in liquid water. Such an embodiment is particularly advantageous since the ejector pump can be designed such that it does not require external (e.g. electrical or pneumatic) energy. It is particularly economical and robust and moreover needs very little installation space.

The water injection device or ejector pump is preferably formed in such a way that it can introduce the liquid water collected in the water sink into the oxidant flow. The liquid water is thereby introduced directly into the turbulent part of the oxidant flow from the collecting reservoir as a result of the low static pressure, whereby increased atomization is effected. A film is prevented from forming on the wall and complete emptying of the water sink can also be ensured with lower flow rates.

The fuel cell system preferably has at least one adjusting mechanism. The adjusting mechanism can be formed to alter the position of the water injection device in the supply line. In particular, the adjusting mechanism can be suitable for conveying the water injection device into a first or lowered position, in which the water injection device impedes the oxidant flow to a lesser extent than in a second or raised position assumed by the water injection device in the event that at least some water has collected in the water sink. In the second position, the water injection device is capable of injecting liquid water into the oxidant flow.

The adjusting mechanism preferably includes a float which is fastened to the water injection device. Furthermore, the adjusting mechanism preferably includes a joint which connects the water injection device rotatably to the supply line.

The fuel cell system can have a plurality of water sinks. The at least one water injection device can be fluid-connected to the plurality of water sinks, for example via corresponding water lines. At least one, preferably all, of the plurality of water sinks can each include a closing device. The closing device can be formed to interrupt the fluid connection between the water sink and the at least one water injection device. In the event of a non-local reintroduction of the liquid water of one or more sinks, a closing device, for example a structure actuated by a float, is advantageous for closing the water lines or intake lines which are not required in each case. The intake capacity of the water injection device can thus be focused on the water sinks which are actually storing liquid water. Parasitic air flows without a liquid water fraction are prevented or reduced. A common water injection device for a plurality of water sinks, even across various functions (return prevention/stopping action in the fluid direction), can be realized by passive water or intake lines to the respective water sinks.

With the technology disclosed here, it is possible to prevent damage to components and at the same time to achieve improved atomization and better efficacy of the original water injection through the efficient reintroduction of returning waste water. The system operates predominantly with passively actuated components and is therefore very reliable.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
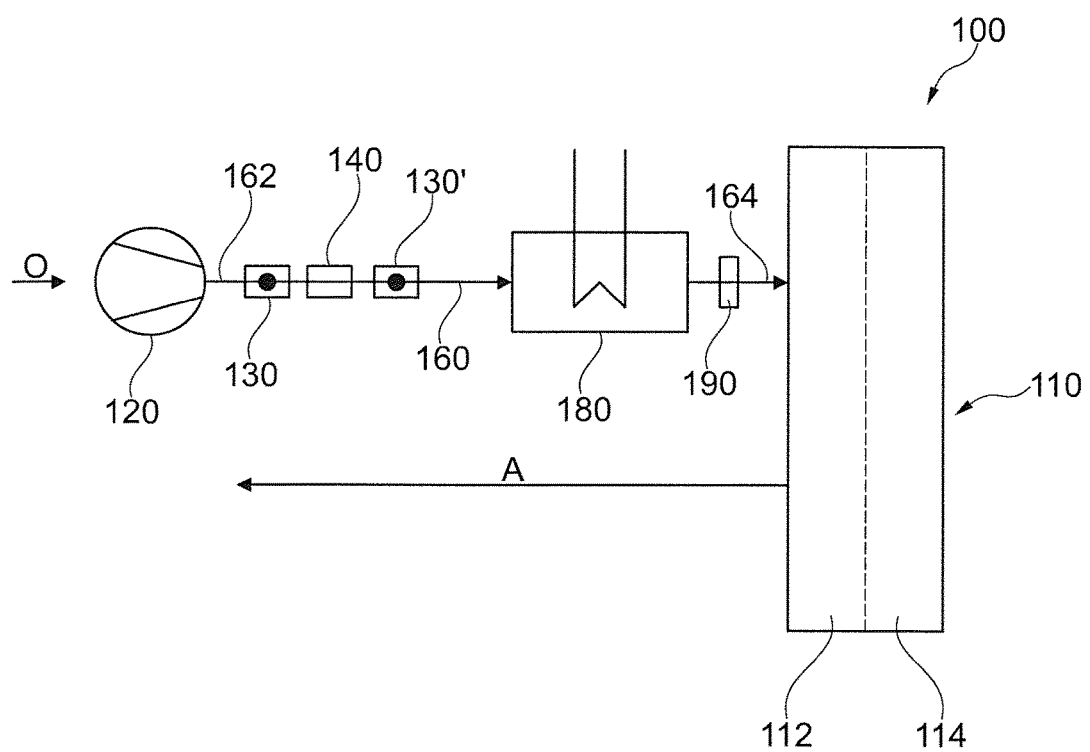
FIG. 1 is a schematic illustration of the fuel cell system 100 disclosed here.
Figure 2:
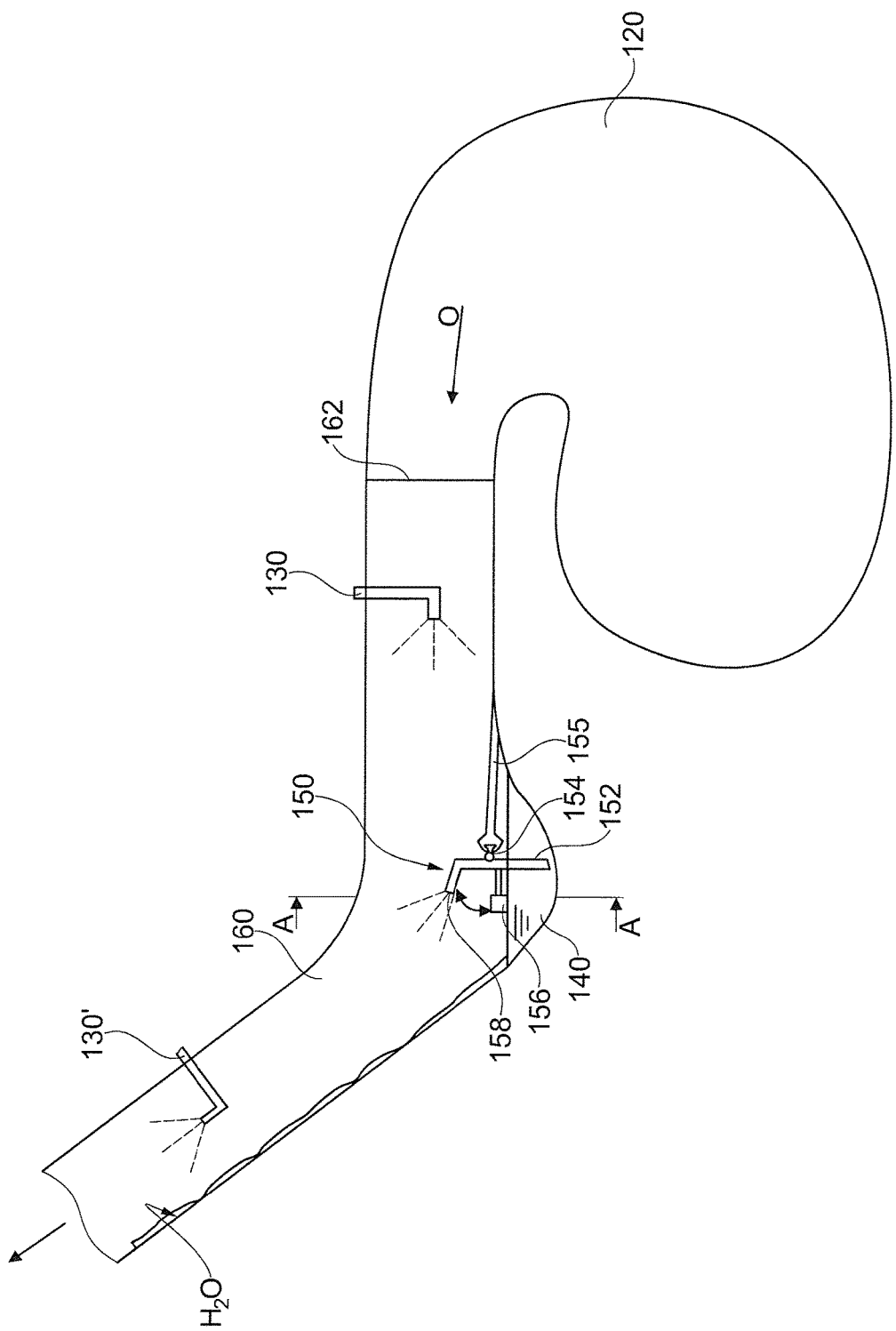
FIG. 2 is a schematic illustration of a supply line 160 having a water injection device 150.

FIG. 1 shows a schematic view of the construction of the fuel cell system 100. The fuel cell system 100 includes a fuel cell 110 having a cathode 112 and an anode 114, which are separated from one another by an ion-separator shown here by dashed lines. The supply line 160 has a first end 162, which is connected to the oxidant conveyor 120, for example a compressor 120. The second end 164 of the supply line 160 ends in the cathode 112 of the fuel cell 110. For simplicity, only one fuel cell 110 is shown here. A plurality of fuel cells 110 are preferably combined to form a fuel cell stack. The humidifier 130, which here comprises, for example, an injection nozzle through which water is injected into the oxidant flow O, is arranged at the first end 162 of the supply line 160. A water sink 140 is arranged downstream of the humidifier 130 (c.f. FIG. 2). A second humidifier 130' is arranged between the heat exchanger or charge air cooler 180 and the water sink 140. A water separator 190, which separates any water from the oxidant flow O a short distance before the fuel cell 110, is furthermore provided between the charge air cooler 180 and cathode-side inlet of the fuel cell 110. Following the electrochemical reaction in the fuel cell, the oxidant O exits the fuel cell as fuel cell exhaust gas A.

FIG. 2 shows a schematic and enlarged view of a detail of the supply line 160 and the oxidant conveyor 120. The oxidant conveyor 120 is connected to the first end 162 of the supply line 160. The oxidant conveyor 120 is located in a deeper position than other sections of the supply line 160. The oxidant conveyor 120 generates an oxidant flow O. This oxidant flow O has a turbulent flow and a comparatively high temperature. In the region adjacent to the first end 162 of the supply line 160, water is introduced into the supply line 160 by the humidifier 130. This water is distributed in a finely dispersed manner in the turbulent oxidant flow O and, for the most part, evaporates. A second humidifier 130', which likewise introduces water into the oxidant flow O, is shown further downstream. However, some of the water introduced does not evaporate completely or condenses on the walls of the supply line 160. This results in water collecting on the supply-line walls. In the embodiment shown here, this water flows back into the water sink 140. The water sink is dimensioned such that it can store sufficient liquid water so that no liquid water flows back into the oxidant conveyor 120.

The liquid water collected in the water sink 140 is introduced back into the oxidant flow O through a water injection device formed as an ejector pump. The ejector pump includes an inlet pipe 152 which projects into the water sink 140. The electric head 158 takes in the liquid water through the inlet pipe 152, and this liquid water is then distributed in a finely dispersed manner in the turbulent oxidant flow O. The ejector pump 150 is preferably dimensioned such that, even with low quantities of oxidant flow O, it can introduce sufficient water so that, at most, low quantities of liquid water collect in the water sink 140. The quantity of liquid water in the supply line 160 is thus reduced, which has a positive effect on the cold start behavior. The risk of frozen liquid water damaging the supply line 160 is also considerably reduced. The inlet pipe 152 is connected to a float 156 via a rigid connection. The inlet pipe 152 is furthermore connected to the supply line 160 via a joint 154 and a holder 155. The joint 154 and the float 156 are formed in such a way that they enable the ejector pump 150 to pivot about the joint 154. In particular, with a very low water level, the ejector pump 150 can assume a first position in which the ejector pump impedes the oxidant flow O to a lesser extent than in a second position assumed by the ejector pump 150 when water has collected in the water reservoir 140. In this second position, the electric head 158 is arranged in the oxidant flow O and introduces liquid water into the oxidant flow O.

Figure 3:
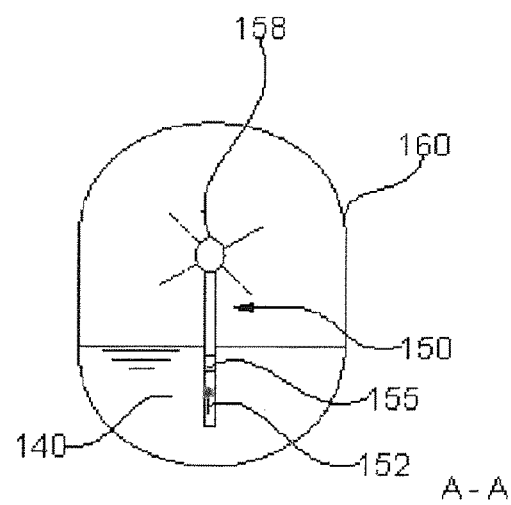
FIG. 3 is a cross-sectional view along the line A-A of FIG. 2.

FIG. 3 shows a cross-section along the line A-A along FIG. 2. The inlet pipe 152 projects into the liquid water collected in the water sink 140. The liquid water rises in the inlet pipe 152 and is sprayed out through the ejector 158.

Figure 4:
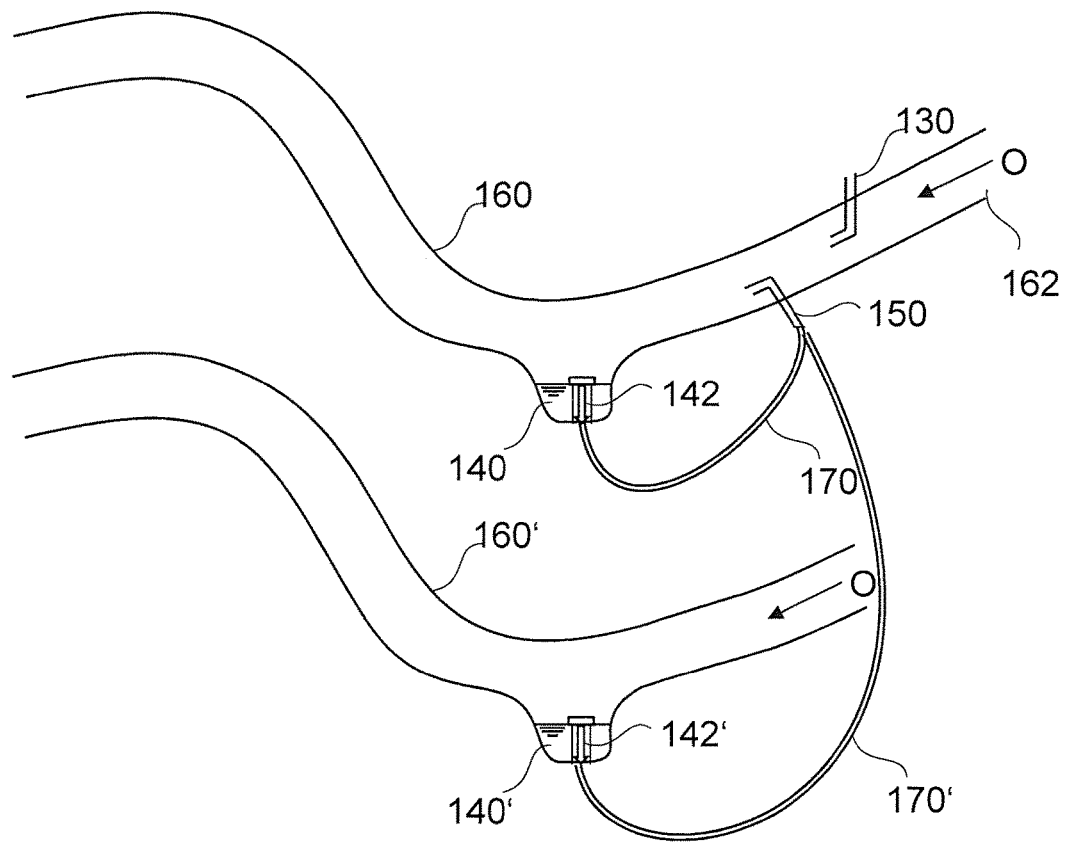
FIG. 4 is a fuel cell system 100 having a plurality of water sinks 140, 140'.

FIG. 4 shows the supply line 160 and a further portion 160' of the supply line 160. The further portion 160' can be arranged, for example, further downstream, e.g. near the second end 164 of the supply line 160. Two parallel supply lines 160, 160' would likewise be usable. Liquid water can collect in the water sinks 140, 140', as has also been described above with respect to the other figures. The two water sinks 140, 140' are connected via water lines 170, 170' to a common water injection device 150 which introduces the collected liquid water of the water sinks 140, 140' back into the oxidant flow O, preferably in the vicinity of the oxidant conveyor 120, since the evaporation/vaporization can be achieved particularly effectively in this region. The water lines 170, 170' and the water injection device 150 are preferably formed and arranged in such a way that the liquid water can be taken in passively, i.e. without the use of electrical and/or mechanical energy. An ejector pump 150, for example, can be used for this. The water sinks 140, 140' here each comprise a closing device 142, 142' which is formed to interrupt the fluid connection between the respective water sink 140, 140' and the at least one water injection device 150. To this end, the closing device 142, 142' can comprise a float, for example, which is connected to a water sink opening valve and opens or closes this latter depending on the water level. If there is no liquid water in the water sink 140', for example, the valve 142' is closed and the intake line 170' does not take in any air. The full intake capacity of the water injection device 150 is then available for the water sink 140. The water sink 140, the supply line 160, the water injection device 150 and the humidifier 130 can otherwise correspond to the remaining figures.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A fuel cell system, comprising:
   at least one fuel cell;
   an oxidant conveyor, which conveys an oxidant through a supply line to the fuel cell;
   at least one humidifier, which introduces water into the oxidant flow; and
   at least one water sink, which is arranged between the at least one fuel cell and the oxidant conveyor, and wherein the at least one water sink is formed adjacent to the oxidant conveyor,
   wherein the water sink is arranged to be a maximum of about 0.2L away from the oxidant conveyor, wherein L is the distance of the oxidant flow between the oxidant conveyor and a heat exchanger in the supply line.

2. The fuel cell system as claimed in claim 1, wherein the humidifier is arranged to be a maximum of about 0.2L away from the oxidant conveyor.

3. The fuel cell system as claimed in claim 1, wherein the humidifier is arranged to be a maximum of about 0.1L away from the oxidant conveyor.

4. The fuel cell system as claimed in claim 1, wherein the humidifier is arranged to be a maximum of about 0.05L away from the oxidant conveyor.

5. The fuel cell system as claimed in claim 1, wherein the water sink is formed and arranged in the supply line such that it prevents liquid water located in the supply line from flowing to and/or into the oxidant conveyor.

6. The fuel cell system as claimed in claim 1, wherein the water sink is dimensioned such that it can store sufficient liquid water so that no liquid water flows back into the oxidant conveyor.

7. A fuel cell system, comprising:
at least one fuel cell;
an oxidant conveyor, which conveys an oxidant through a supply line to the fuel cell;
at least one humidifier, which introduces water into the oxidant flow;
at least one water sink, which is arranged between the at least one fuel cell and the oxidant conveyor, and wherein the at least one water sink is formed adjacent to the oxidant conveyor;
a water injection device associated with the water sink; and
an adjusting mechanism, wherein the adjusting mechanism is formed to alter a position of the water injection device in the supply line.

8. The fuel cell system as claimed in claim 7, wherein
the adjusting mechanism comprises a float, which is fastened to the water injection device, and
the adjusting mechanism comprises a joint which connects the water injection device rotatably to the supply line.

9. The fuel cell system as claimed in claim 7, wherein the water injection device is formed as an ejector pump.

10. A fuel cell system, comprising:
at least one fuel cell;
an oxidant conveyor, which conveys an oxidant through a supply line to the fuel cell;
at least one humidifier, which introduces water into the oxidant flow; and
at least one water sink, which is arranged between the at least one fuel cell and the oxidant conveyor, and wherein the at least one water sink is formed adjacent to the oxidant conveyor;
wherein the water sink is fluid-connected to at least one water injection device associated with the water sink.

11. The fuel cell system as claimed in claim 10, wherein the water injection device is arranged immediately adjacent to the water sink in the supply line.

12. The fuel cell system as claimed in claim 10, wherein the water injection device is formed to introduce the liquid water collected in the water sink into the oxidant flow.

13. The fuel cell system as claimed in claim 11, wherein the water injection device is formed to introduce the liquid water collected in the water sink into the oxidant flow.

14. The fuel cell system as claimed in claim 10, wherein the fuel cell system comprises a plurality of water sinks, and wherein the at least one water injection device is fluid-connected to the plurality of water sinks.

15. The fuel cell system as claimed in claim 14, wherein at least one of the plurality of water sinks comprises a closing device which is formed to interrupt the fluid connection between the water sink and the at least one water injection device.

* * * * *